H. B. BACON.
SPRING MOUNT FOR VEHICLES.
APPLICATION FILED JULY 24, 1920.
1,393,068.
Patented Oct. 11, 1921.
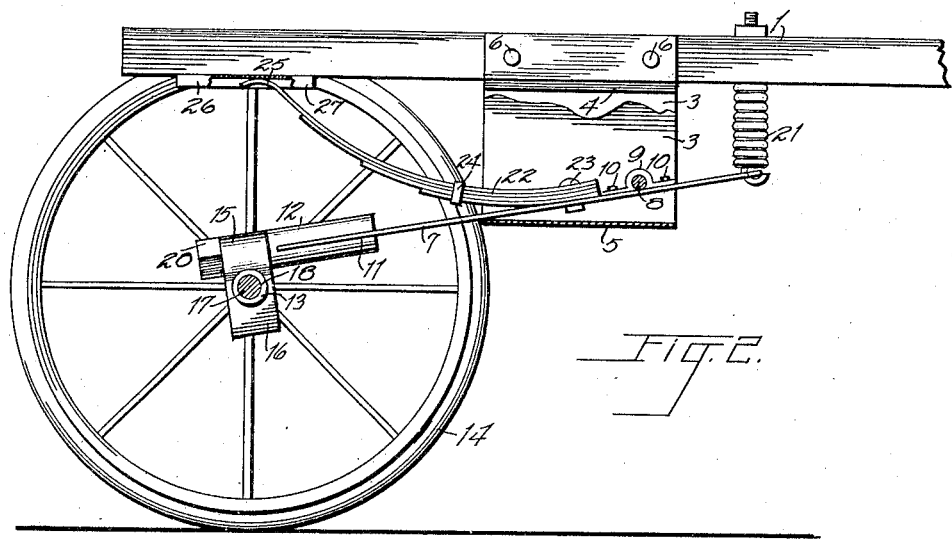
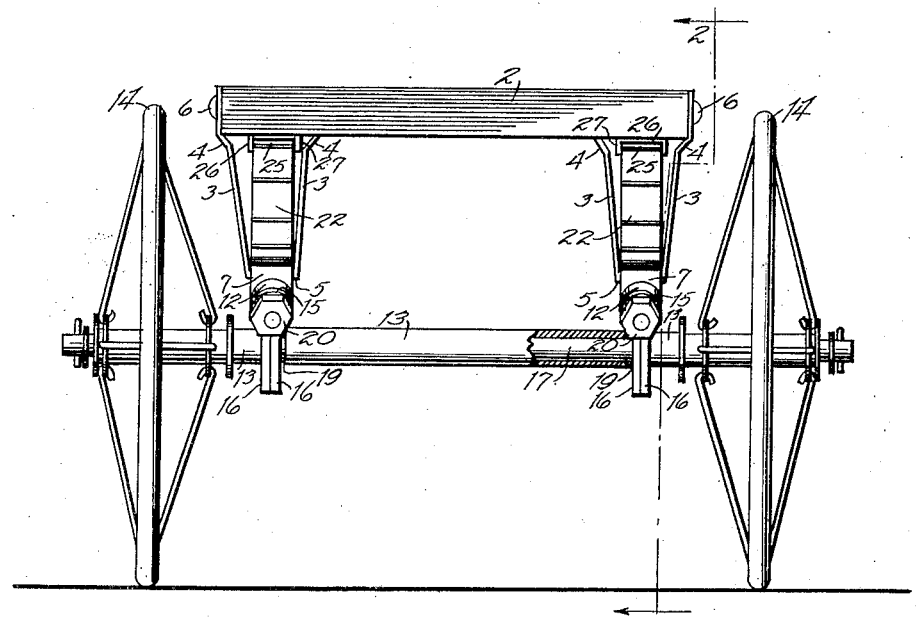
INVENTOR
H. B. Bacon
BY
ATTORNEYS

UNITED STATES PATENT OFFICE.

HASTINGS BULLEN BACON, OF VIRGINIA, MINNESOTA.

SPRING-MOUNT FOR VEHICLES.

1,393,068.     Specification of Letters Patent.     Patented Oct. 11, 1921.

Application filed July 24, 1920. Serial No. 398,610.

*To all whom it may concern:*

Be it known that I, HASTINGS BULLEN BACON, a citizen of the United States, and a resident of Virginia, in the county of St. Louis and State of Minnesota, have invented a new and useful Improvement in Spring-Mounts for Vehicles, of which the following is a full, clear, and exact description.

My invention relates to improvements in spring mounts for vehicles, and it consists in the combinations, constructions, and arrangements herein described and claimed.

An object of my invention is to provide a spring mount for vehicles having means for obtaining a maximum resiliency with a minimum oscillatory movement of the frame of the vehicle to which applied relative the axles of the same.

A further object of my invention is to provide a device of the type described that is designed to operatively connect the side frame members of the vehicle with the axles of the same.

A further object of my invention is to provide a device of the type described that can be applied to vehicles, such as automobiles of a standard construction, without the necessity of making extensive changes in the construction of the latter.

A further object of my invention is to provide in a device of the type described a novel form of spring construction.

A further object of my invention is to provide a device of the type described that is simple in construction, efficient in operation, and thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a view showing the use and application of the device.

Fig. 2 is a section along the line 2—2 of Fig. 1.

In carrying out my invention, I make use of a frame, the side and rear end members of which are shown in the accompanying drawings and denoted by the reference numerals 1 and 2, respectively. Brackets comprising side members 3, offset along their upper edges at 4 to engage with the side members 1, and a bottom 5, are secured to the side members 1 at a spaced distance from the ends thereof by any suitable means, such as the bolt 6. A beam 7 is pivoted upon a pivot pin 8 that has its ends secured in the sides 3 of the bracket for movement between the sides 3 in a vertical plane, the pivotal connection being effected in the form of the device shown in the drawing by means of a bearing 9 that is secured to the beam 7 by bolts 10, as shown.

It is to be noted that the point of pivotal connection of the beams 7 with the brackets and consequently with the side frame members 1 is at a spaced distance from the forward end of the beams, and that the distance from the point of pivotal connection to the forward end of each beam is considerably less than the distance from the point of pivotal connection to the rearward end of the beam. The rearward end of each beam is rigidly secured in a recess 11 provided in a bar 12 that is removably and rotatably mounted upon an axle housing 13 which is provided for a rear axle 17 that carries wheels 14. This is accomplished by projecting the end of the bar 12 through the clamping sleeve portion 15 of a member having downwardly depending side arms 16 rotatably mounted upon the axle housing 13 and prevented from slidable movement therealong in any suitable manner, as by having the arms 16 formed with registering openings 18 adapted to engage a recessed portion 19 of the axle housing. A nut 20 screwing on the threaded end of the bar 12 maintains the latter in the position shown in the drawings.

Connecting the forward end of the beam 7 with the side member 1 is a coil spring 21. A leaf spring 22 is disposed between that portion of the beam 7 positioned to the rear of the pivot 8 and the side member 1, and consists of a plurality of superposed leaves having their forward ends terminating at a point adjacent the pivot 8 and secured to the beam at that point in any suitable manner, as by means of a bolt 23. The leaves are bound together by a band 24 and have their rearward ends terminating, as shown, the extreme rearward end of the upper leaf in the spring being bent at 25 and slidably disposed in the guideway 26 in a member 27 secured to the under side of the side member 1 in the position shown.

From the foregoing description of the various parts of the device, the operation thereof may be readily understood. The bottom 5 of the hanger limits the movement of the beam 7 downwardly about its pivot 8. The action of the springs 21 and 22 tends to prevent movement of the rear portion of the beam 7 upwardly about its pivot 8. In service, the rear axle will be moved upwardly as the wheels 14 encounter inequalities in the surface traversed. The shocks and jars occasioned thereby will not be communicated to the frame of the vehicle, since the same will be dissipated by the action of the springs 21 and 22, this being particularly true since the rearward end of the spring 22 will be slidably moved in the guide-way 26. Since the distance from the pivot 8 to the axle 17 greatly exceeds the distance from the pivot 8 to the forward end of the beam 7, it is apparent that a relatively great oscillatory movement of the axle in a vertical plane is possible with but slight movement of the frame. Consequently, the frame will remain in horizontal position while the wheels carried at either side thereof are traversing inequalities in road surface, such as ruts, fills, and the like.

While I have shown the device applied to the rear axle of a vehicle, it is to be understood that the same construction is provided for the front axle of the vehicle.

It will also be understood that a compression spring (not shown) may be substituted for the leaf spring 22.

I claim:

1. The combination with the frame of a vehicle of a spring mount therefor comprising an axle, wheels carried by the axle, a pair of members arranged to extend substantially parallel with the side members of said frame, each of said members being pivoted adjacent one end thereof with the axle, rigid means for pivotally connecting each member intermediate its length with a side member of the frame, and spring means interposed between said members and said frame for yieldingly permitting movement of said axle toward said frame.

2. The combination with the frame of a vehicle of a spring mount therefor comprising an axle, wheels carried by the axle, a pair of beams each having a pivotal connection adjacent one end with the axle, means for pivotally connecting each beam intermediate its length with a side member of the frame, tension means connecting the free end of each beam with a side member of the frame, an auxiliary spring means interposed between the side member of the frame and that portion of the beam extending between its pivotal connections with the axle and with the means for connecting the same to the frame, whereby yieldable movement of the axle toward the frame is permitted.

3. The combination with the frame of a vehicle of a spring mount therefor comprising an axle, wheels carried by the axle, a pair of beams, each having a pivotal connection adjacent one end with the axle and arranged to extend substantially parallel with a side member of the frame in a lower plane, a bracket secured to each side member of the frame to depend therebelow, means for pivoting each beam intermediate its length to said bracket, tension means connecting the free end of said beam with the side member of the frame, and spring means interposed between that portion of each beam extending between the bracket and the rear axle and the adjacent side member of the frame.

4. The combination with the frame of a vehicle of a spring mount therefor comprising an axle, wheels carried by the axle, a pair of beams, each having a pivotal connection adjacent one end with the axle and arranged to extend substantially parallel with a side member of the frame in a lower plane, a bracket secured to each side member of the frame to depend therebelow, means for pivoting each beam intermediate its length to said bracket, tension means connecting the free end of said beam with the side member of the frame, a leaf spring disposed between that portion of each beam extending between the bracket and the axle and the side member of the frame, and a guideway secured to the under surface of said side member of the frame, said guideway being adapted to receive the adjacent end of said leaf spring and to permit slidable movement of the latter therealong.

HASTINGS BULLEN BACON.